United States Patent Office 3,368,323
Patented Feb. 13, 1968

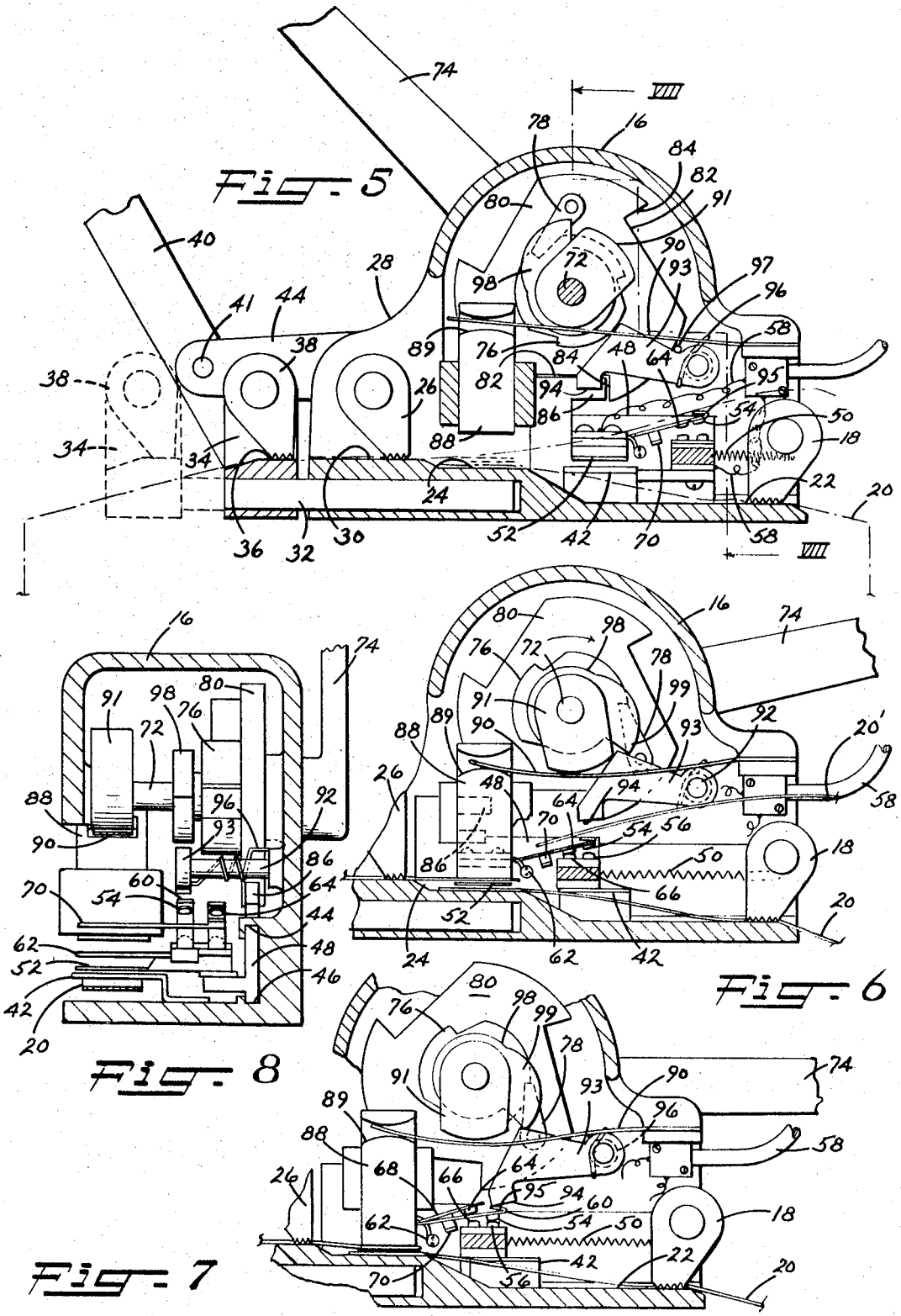

3,368,323
STRAP SEALING METHOD AND APPARATUS
Philip Wood, Monte Sereno, Calif., assignor to FMC Corporation, Philadelphia, Pa., a corporation of Delaware
Filed Oct. 12, 1964, Ser. No. 403,216
10 Claims. (Cl. 53—198)

ABSTRACT OF THE DISCLOSURE

A method and apparatus for heat sealing together overlapping portions of a molecularly longitudinally oriented polymeric binding strap. The overlapping strap portions are pressed against a heated element positioned therebetween to effect a softening or melting of the inner faces of the strap, after which the heated element is removed and the softened faces are pressed together to effect a seal.

---

The present invention relates to a method of heat sealing overlapping ends of molecularly oriented polymeric strapping material and to apparatus for tensioning such strapping material about an article and heat sealing together overlapping ends thereof. Insofar as the method of heat sealing is concerned, the present invention constitutes an improvement over the invention described and claimed in the application of David S. Bartlett, Jr., Ser. No. 343,000, filed Feb. 6, 1964.

In the packaging field it is common practice to provide tensioned bands (usually in the form of steel straps) about single packages or groups of packages for reinforcement and for securement purposes. The steel bands or straps are held in place by sleeve-like seals which are crimped about overlapping ends thereof or in some cases the overlapping ends are spot welded together. Recently, as a substitute for steel band strapping material, there have been developed straps formed of various long-chain linear film-forming polymers and copolymers. These new strapping materials may be referred to as "polymeric" straps. Desirably, polymeric straps should be secured by heat sealing the overlapping ends together but it has been found that this requires special techniques and it is toward the advancement of such techniques and to apparatus for carrying them out that the present invention is directed.

As mentioned, polymeric straps may be formed of various polymers and copolymers. For reasons of economic feasibility, a preferred material is polypropylene and the invention will be specifically described in connection with such material but it will be understood that the invention is also applicable to straps formed of other materials such as polyolefins, polyesters, polyamides, etc. In general, polypropylene straps are formed by extruding the molten polymer through a slit orifice into a quench bath or between cold rollers to form a structure in which the long-chain molecules of the polymer are heterogeneously arranged. This initial structure is characterized by relatively low tenacity and high elongation and consequently is not suitable for use in the manner of steel strapping. However, by elongating the structure, either by cold rolling or by stretching at an elevated temperature, the molecules are caused to become oriented substantially uniaxially in the direction longitudinally of the structure which is then characterized by greatly increased tenacity and substantially reduced elongation. Such an oriented polymeric strap is ideally suited for use in the packaging field. Although polypropylene, as is the case with many other polymers, has a fairly low melting point and is readily heat sealable, the molecularly oriented strapping loses its molecular orientation and shrinks back to approximately the initial extruded length when heated even to a temperature somewhat below the melting point of the polymer. This of course has made it difficult to heat seal a highly tensioned oriented strap without producing a weakness in the area of the seal.

It is an object of the present invention to provide an improved method of heat sealing together overlapping portions of oriented polymeric strapping in such manner as to avoid substantial loss of molecular orientation and produce a joint which is able to withstand substantially as much tension as the strap itself.

Another object of the invention is to provide an apparatus for carrying out the method.

A further object of the invention is to provide a tool useful for tensioning oriented polymeric strapping material about an article and heat sealing together overlapping portions thereof.

Other and further objects, features and advantages of the invention will become apparent as the description of a preferred embodiment thereof proceeds.

Referring now to the drawing:

FIG. 5 is a vertical longitudinal section through the tool showing the parts in the position prior to the beginning of the heat sealing operation;

FIG. 6 is a sectional view of a portion of the mechanism showing in FIG. 5, showing the position of the parts at the beginning of the heat sealing operation;

FIG. 7 is a view similar to FIG. 6 showing the parts as they became at a later stage in the heating sealing operation; and FIG. 8 is a view taken along the line VIII—VIII of FIG. 5.

Figure 1:
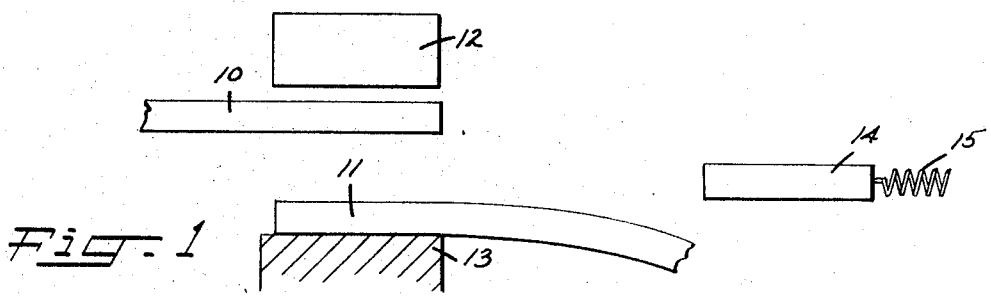
FIG. 1 is a diagrammatic showing of one of the steps in the improved method.
Figure 2:
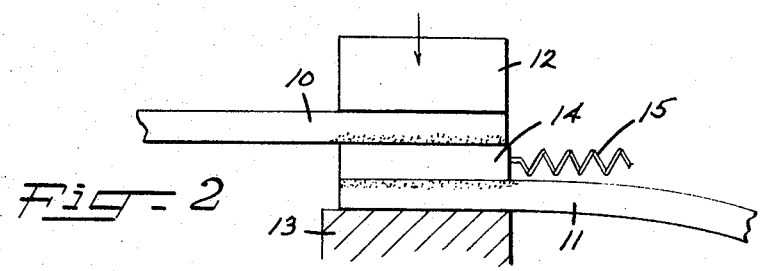
FIG. 2 is a diagrammatic showing of another step in the method.
Figure 3:
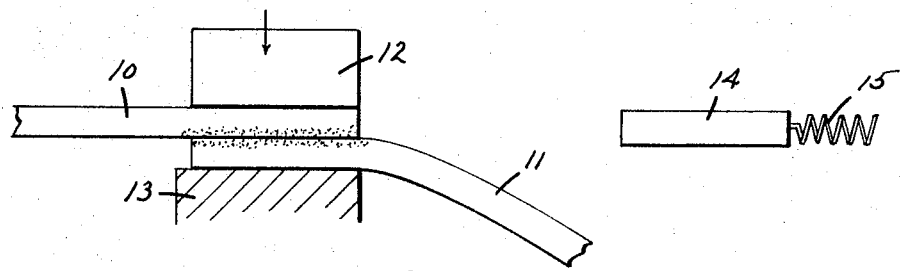
FIG. 3 is a diagrammatic showing of the final step in the method.
Figure 4:
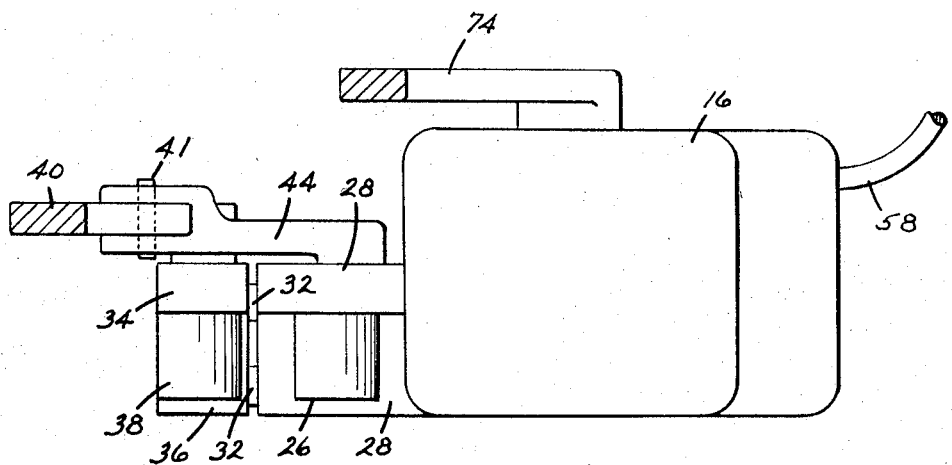
FIG. 4 is a top plan view of an apparatus or tool for tensioning oriented polymeric strapping about an article and heat sealing together overlapping portions thereof.

Referring first to FIGS. 1–3 for an explanation of the improved method, end portions 10 and 11 of a molecularly oriented polymeric strap are positioned in face-to-face spaced apart relationship as shown in FIG. 1, with end portion 10 underlying a pressing or squeezing block 12 and end portion 11 resting on a support 13. The strap itself has a rectangular cross-section and in FIGS. 1–3 it is the narrow edge of the strap which is shown on a greatly enlarged scale. Actually the strap is about 0.02" thick and usually somewhere between ¼" and 1¼" wide. The strap, between ends 10 and 11, will normally be tensioned about an article such as a carton or box at the time of the heat sealing operation but preferably this is accomplished in such a way that the overlapping end portions are relaxed or untensioned. With the strap ends thus positioned, a heating element 14 is inserted therebetween and pressing block 12 is urged downward to squeeze the heating element between the strap ends. The heating element is preferably in the form of a flat blade and preferably is not heated until it is positioned between the strap ends as shown in FIG. 2. Heating element 14 is constantly urged, as by means of a spring 15, to slide from between the overlapping strap ends but the strap ends are pressed thereagainst with sufficient force that the spring is unable to overcome the friction between the strap ends and the heating element so long as the strap faces are cool and in a solid, unmelted condition. With the heating element in the position shown in FIG. 2, it is then rapidly heated to a substantially elevated temperature, the temperature being about 750° F. when the strap is formed of polypropylene. This causes the face areas of the strap contacting the heating element to melt or soften thereby reducing the friction between the heating element and the strap ends and permitting spring 15 to slide the heating element out from between the overlapping strap ends. The amount of force applied to block 12 is such that spring 15 is effective to move the heating element after the surfaces of the strap ends have softened to a depth of only a few thousandths of an inch, the softened portions being indicated as the speckled areas in FIG. 2. As the heating element is withdrawn, the softened faces of the strap are pressed together as indicated in FIG. 3, whereupon the end portions become firmly fused.

As previously mentioned, heating an oriented polymeric strap destroys the molecular orientation with consequent loss of tensile strength. However, with the sealing method described above, the molecular orientation is affected over only a very small part of the strap cross-section and thus it is possible to obtain a seal which is substantially as strong as the strap itself. Using the friction of the strap against the heating element to restrain the movement of the heating element affords an ideal way of timing the heating operation because by varying the force of spring 15 and the pressure of block 12, any desired depth of heat penetration into the strap may be obtained.

This method of timing the heating is useful whether the heating element is withdrawn transversely of the strap or longitudinally thereof. However, for reasons not fully understood, there appears to be some advantage in sliding the heating element from between the strap ends in the direction longitudinally of the strap, as indicated in the drawings. It is believed that possibly wiping or sliding of the heating element longitudinally of the strap may result in some reorientation of the molecules in the direction longitudinally of the strap, the orientation having been initially destroyed by the heat as aforesaid. At any rate, irrespective of the theory, it has been found desirable to withdraw the heating element in the direction longitudinally of the strap and this constitutes one of the features of the invention.

Referring now to FIGS. 4–8, the tool comprises a housing 16 which may be formed as a casting. Pivotally mounted in or on the housing is a gripper dog 18 for gripping a portion of a strap 20 against a ledge 22 of the housing. The tip end of the strap extends forwardly of the gripper and overlies a ledge 24 of the housing, as shown in FIGS. 5–7. The tool may be rested upon the article being strapped and the strap 20 extends from gripper 18 around the article and is inserted beneath a holding dog 26 which is pivotally mounted on a forwardly extending rib 28 of the housing and serves to pinch the strap against a ledge 30 of the housing. From dog 26 the strap extends over ledge 24 and through the main body of the housing to a supply such as a roll, not shown. Dog 26 is arranged to permit the strap to be drawn tight about the article but prevents retrograde movement thereof.

Slidably mounted within bores provided therefor in the lower portion of housing 16 are a pair of rods 32 secured to which is a member 34 having a ledge 36 lying in the plane of ledge 30. A strap gripping member 38 is pivotally mounted on member 34 and the strap is laced beneath this gripper member as shown in FIG. 5. Pivotally connected to the lower portion of member 34 is one end of an operating lever 40 to which is pivotally connected at 41 one end of a link 44 the other end of which is pivotally connected to the rib 28 of the housing. From FIG. 5 it will be observed that oscillation of lever 40 causes member 34 and the gripper 38 carried thereby to move back and forth between the full and dotted line positions. As member 34 moves forward to the dotted line position, gripper 38 swings counterclockwise and slides over the strap 20 while the strap is held by dog 26. As member 34 moves toward the full line position, gripper 38 presses the strap against the ledge 36 whereby the strap is pushed beneath dog 26, said dog being mounted in such a way as to permit the strap to slide therebeneath in strap tightening direction. Thus operation of lever 40 is effective to tighten the strap about the article. It will be noted that the strap portions overlying the ledge 24 are in a relaxed or untensioned condition.

The strap end portion which is held by gripper 18 is caused to lie fairly flat against the ledge 24 by being directed beneath a heat shield 42 secured at one end to the lower portion of housing 16 and extending cantilever style toward the open side of the housing as shown in FIG. 8. That end portion of the strap to be held by gripper 18 can thus be inserted edgewise beneath heat shield 42 and the gripper. Over the ledge 24, a portion of the strap between dog 26 and the supply of strapping overlies the end which is resting on ledge 24 but is held slightly spaced therefrom due to the proximity of the point where it is held against the ledge 30, such latter ledge being elevated above ledge 24 as shown in FIGS. 5–7.

Slidably mounted within grooves 44 and 46 (see FIG. 8) provided in housing 16 is a carriage 48 which is resiliently urged rearwardly by a spring 50 one end of which is connected to the carriage and the other end of which is anchored to the housing. Extending cantilever from the carriage is a smooth surfaced flat blade heating element 52. The heating element is connected through a relay controlled by a pair of normally open contacts 54 and 56 and an electric cable 58 to a suitable source of preferably low voltage electricity which may be supplied by a battery or through a transformer from the usual electrical outlet. Contact 54 is carried by leaf spring 60 biased to normally hold open the circuit to heating element 52 and movable to engage the contact 54 with contact 56 in a manner presently to be explained.

A strap severing wire 62 is connected to carriage 48 and extends therefrom parallel to blade 52 and in fairly close proximity to the rear edge of said blade. Wire 62 is preferably relatively rigid and is connected through a pair of normally open contacts 64 and 66 to the same low voltage source of electricity as blade 52. Contact 64 is carried by a leaf spring 68 biased to normally hold open the circuit to wire 62. An operating arm 70 extends from leaf spring 68 parallel to wire 62 and is engaged by a portion of the strap in a manner to be explained to cause contacts 64 and 66 to close and thereby energize the severing wire.

Extending through the upper portion of housing 16 and rotatably mounted therein is a shaft 72 to one end of which is secured an operating lever 74. Within the housing, a ratchet wheel 76 is secured to shaft 72 for rotation therewith and said wheel engages a pawl 78 pivotally mounted on a cam 80 which is loosely mounted on said shaft. Cam 80 has a circular periphery having a plurality of cutouts therearound providing adjoining flats 82 and 84 one of the latter of which lies adjacent an upstanding arm 86 of the carriage 48 when operating lever 74 is in its forwardmost position as shown in FIG. 5. To effect the heat sealing of the overlapping strap portions, operating lever 74 is swung clockwise and during the early part of this movement the flat 84 engages arm 86 and slides carriage 48 forward against the action of spring 50 to position the heating element 52 between the strap portions overlying ledge 24, as shown in FIG. 6.

Mounted for vertical sliding movement directly above ledge 24 is a squeezing or pressing element 88 through a slot 89 in which extends one end of a leaf spring 90 the other end of which is fixed in a rear wall of housing 16. A cam 91 is secured to shaft 72 in alignment with spring 90 and at the time carriage 48 reaches its forward position determined by cam flat 84 moving past arm 86, cam 91 engages the spring to thereby move element 88 downward to cause the overlapping strap portions to squeeze against the heating element. As rotation of shaft 72 is continued, the circular periphery of cam 80 bears against arm 86 to prevent retraction of carriage 48 until the next succeeding cam flat 82 moves into position over arm 86, whereupon spring 50 would return the carriage to its home position shown in FIG. 5 except for the fact that element 88 is then pressing downward with sufficient force that the friction between the strap and the blade serves to prevent the heating element 52 from sliding out from between the overlapping strap portions.

As squeezing element 88 moves the upper run of the strap downward, the strap engages the operating arm 70 of leaf spring 68 to cause contact 64 to engage contact 66 and close the circuit to severing wire 62 whereupon said wire is rapidly raised to a substantially elevated temperature which is sufficient to melt through the strap which is pressed thereagainst at a point closely adjacent squeezing element 88. In FIG. 6, the strap portion looped about the article being strapped is shown severed from that portion leading to the supply, the latter portion being indicated in this figure at 20'. As soon as the strap is severed by the hot wire 62, the pressure of the strap is removed from contact operating arm 70 and the contacts 64 and 66 open thereby de-energizing the wire, this condition being shown in FIG. 6.

Pivotally mounted on a stub shaft 92 secured in a wall of housing 16 is a member 93 having a foot portion 94 which when carriage 48 is in the forward or heat sealing position overlies a tab 95 provided on the end of spring 60 carrying the contact 54. A coil spring 96 surrounding stub shaft 92 normally holds member 93 against a stop pin 97, with foot 94 above the line of movement of tab 95. A cam 98 having a lobe 99 is secured on shaft 72 in alignment with member 93 and at about the time severing wire 62 is energized or immediately thereafter lobe 99 contacts the member 93 and swings it down to cause foot portion 94 to engage the tab 95 and close the contacts 54 and 56, whereby heating element 52 is energized as aforesaid, this condition being shown in FIG. 7.

Heating element 52 has a low electrical resistance so that when the circuit thereto is closed it will draw a high current even from a low voltage source and as a result the heating element is very quickly raised to a substantially elevated temperature. This high temperature rapidly softens or melts the surface areas of the strap which are in contact with the heating element thus rendering those surfaces slippery and reducing the friction between the strap and the heating element. The amount of pressure applied to and by pressing element 88 is such that spring 50 becomes effective to slide the heating element from between the strap ends after the facing strap portions have been softened to a depth of only a few one-thousandths of an inch. As spring 50 returns carriage 48 to its home position, contact operating tab 95 slides from beneath the foot portion 94 of member 93 and contacts 54 and 56 open, thereby de-energizing the heating element. As soon as the heating element slides out from between the strap ends, pressing element 88 squeezes the melted strap portions together whereupon after about one-half second the ends fuse together with such force as to withstand substantially as much tension as the main body of the strap. Operating lever 74 is then swung back to the FIG. 5 position to permit spring 90 to raise the pressing element 88 and release the fused joint. Upon release of the strap gripping elements 18, 26 and 38 the tool is slid sideways from beneath the now sealed strap.

Having thus described the invention, what is claimed is:

1. The method of heat sealing together in overlapping face-to-face relationship opposite end portions of a polymeric strap wherein the molecules are oriented longitudinally of the strap comprising positioning the end portions of the strap in face-to-face spaced apart relationship, inserting a heating element between the end portions of the strap, pressing the end portions of the strap against the heating element while it is hot to cause the strap surfaces engaging the heating element to soften, sliding the heating element in a direction longitudinally of the strap from between the end portions of the strap, and pressing the softened surfaces of the strap together.

2. A device for heat sealing overlapping end portions of an oriented polymeric strap comprising a heating element, means for moving said heating element from a home position to a position between the overlapping end portions, means for squeezing the overlapping end portions against said heating element, means for heating said heating element to cause a melting of the surfaces of the end portions of the strap squeezed thereagainst, and means responsive to the melting of the surfaces of the end portions of the strap to slide said heating element from between the overlapping end portions of the strap.

3. A strap tensioning and sealing tool for use with oriented polymeric strapping comprising gripping means for holding one end portion of a strap loop encircling an article, tensioning means for drawing the strap loop taut with a portion of the strap overlapping the held end portion, a heating element having a home position, means for moving said heating element from its home position to a position between the overlapping portions of the strap, resilient means urging said heating element toward its home position, squeezing means for squeezing the overlapping portion of the strap against said heating element whereby friction between the strap and the heating element prevents said heating element from being moved by said resilient means, and means for heating said heating element to cause a softening of the surfaces of the strap contacting said heating element with a consequent reduction of friction between the strap and the heating element whereby said resilient means becomes effective to slide said heating element from between the strap portions and return it to its home position.

4. The tool set forth in claim 3 wherein said heating element is moved in the direction longitudinally of the strap.

5. The tool set forth in claim 3 wherein said gripping means and said tensioning means are constructed and arranged to hold the overlapping strap portions in relaxed condition.

6. A strap tensioning and sealing apparatus for use with oriented polymeric strapping comprising gripping means for holding one end portion of a strap loop encircled about an article and means for drawing the strap loop taut with a portion of the strap extending to a supply lapping the held end portion, a heating element, means for moving said heating element longitudinally of the strap from a home position to a position between the lapping portions of the strap, means urging said heating element to return to the home position, squeezing means squeezing the lapping strap portions against said heating element whereby friction between the strap and the heating element prevents said heating element from returning to its home position, means for severing the strap from the supply adjacent said squeezing means, and means for heating said heating element to cause a softening of the surfaces of the strap and consequent reduction of friction between said heating element and the surfaces of the strap contacting the heating element whereby said heating element is permitted to slide from between the strap portions and return to home position.

7. The apparatus set forth in claim 6 wherein the means for severing the strap comprises an electrically energizable member and a switch for controlling energization of said member, said switch being operable by that portion of the strap extending to the supply as said lapping strap portions are squeezed against said heating element by said squeezing means.

8. A strap tensioning and sealing tool for use with oriented polymeric strapping comprising gripping means for holding one end portion of a strap loop encircling an article and means for drawing the strap loop taut with a portion of the strap extending to a supply overlapping the held end portion, a movably mounted heating element having a home position, resilient means urging said heating element to remain in its home position, a manually rockable shaft, cam means on said shaft for moving said heating element longitudinally of the strap from its home position to a position between the overlapping portions of the strap, squeezing means for squeezing the overlapping portions of the strap against said heating element, means on said shaft for operating said squeezing means, electrically operated strap severing means, a normally open switch for energizing said severing means, said switch being arranged to be closed by the strap when said squeezing means is operated to thereby sever the strap from the supply when the overlapping strap portions are squeezed against said heating element, a normally open switch for energizing said heating element, means on said shaft for closing said last mentioned switch as said squeezing means is operated to squeeze the strap against said heating element, said resilient means being of such strength as to be incapable of overcoming the friction between the strap and heating element when said strap is cool but effective to restore the heating element to home position when the contacting strap portions become fluid.

9. A device for heat sealing overlapping portions of an oriented polymeric strap comprising energy applying means for applying sufficient energy to overlapping strap portions to soften only the facing areas of the strap portions and render the same slippery, and means operating as a result of the facing areas of the strap becoming slippery to discontinue the application of energy to the overlapping strap portion.

10. The method of heat sealing together in overlapping face-to-face relationship opposite end portions of an oriented polymeric strap comprising positioning the end portions of the strap in face-to-face spaced apart relationship, inserting a heating element between the end portions of the strap, constantly urging the heating element to slide out from between the end portions of the strap, pressing the strap end portions against the heating element while it is hot with sufficient force that the friction between the strap end portions and the heating element prevents the heating element from moving until such time as the strap portions engaging the heating element soften thereby reducing the friction between the heating element and the strap portions, and pressing the softened surfaces of the strap together.

References Cited
UNITED STATES PATENTS

| | | | |
|---|---|---|---|
| 2,401,991 | 6/1946 | Walton et al. | 156—380 |
| 2,982,069 | 5/1961 | England | 100—2 X |
| 3,200,028 | 8/1965 | Chisholm | 156—499 |

TRAVIS S. McGEHEE, *Primary Examiner.*